United States Patent [19]

Steydle et al.

[11] 4,069,842
[45] Jan. 24, 1978

[54] QUICK-FITTING PIPE COUPLING

[75] Inventors: Guy Steydlé; Bernard Poisson, both of Boulogne Billancourt, France

[73] Assignees: Regie Nationale des Usines Renault, Paris; Automobiles Peugeot, Paris, both of France

[21] Appl. No.: 703,852

[22] Filed: July 9, 1976

[30] Foreign Application Priority Data

July 11, 1975 France ............................. 75.21814

[51] Int. Cl.² ........................................... F16L 29/00
[52] U.S. Cl. ........................... 137/595; 137/614.06; 285/133 R
[58] Field of Search ............... 251/89.5, 149.1, 149.6, 251/149.9; 285/308, 133 R; 137/614.06, 625.18, 625.19, 637.1, 637.05, 595

[56] References Cited

U.S. PATENT DOCUMENTS

| 477,125 | 6/1892 | Johnson et al. | 251/149.9 |
| 1,634,813 | 7/1927 | Whitehead | 137/625.19 X |
| 2,568,516 | 9/1951 | Scheiwer | 251/149.6 |
| 3,693,655 | 9/1972 | Frisk | 251/149.9 X |
| 3,885,608 | 5/1975 | Ayres | 251/149.6 X |

Primary Examiner—Martin P. Schwadron
Assistant Examiner—Richard Gerard
Attorney, Agent, or Firm—Fleit & Jacobson

[57] ABSTRACT

A coupling member for a quick-fitting pipe coupling comprising two separate fluid passages communicating each through a different port formed in the sliding socket with two series of passages formed separately in the body and the locking member, thus affording the simultaneous coupling of a double fluid circuit by using a single coupling member.

7 Claims, 3 Drawing Figures

QUICK-FITTING PIPE COUPLING

The present invention relates to improvements in and relating to quick-fitting pipe couplings of the kind disclosed in the U.S. patent application Ser. No. 555,105 of Mar. 4, 1975, now U.S. Pat. No. 4,029,125, and is concerned more particularly with an arrangement permitting the simultaneous coupling of a double fluid-circulation circuit by means of a single coupling member.

In the above-mentioned patent application there is described and illustrated a quick-fitting pipe coupling of the type comprising a body adapted to be secured to the frame structure of a machine or like structure, a coupling member proper and a locking member secured to said body, in order to direct the fluid into said coupling at right angles to the direction in which said coupling member is fitted, said coupling member being adapted to be sunk into the body incorporating locking means comprising a socket slidably mounted on, and surrounding, said coupling member, said socket opening the fluid passage when the coupling member is sunk into the body and closing said fluid passage when the device is uncoupled, the locking member secured to said coupling member permitting the passage of fluid through it while locking the coupling member in the selected position in said body, the disengagement of said coupling member being permitted only when the fluid passage is shut off.

It is now a frequent occurrence that certain components of machine tools such as sets of hydraulic cylinders or so-called double-acting motors have to be supplied with hydraulic fluid through a double circuit. For the sake of simplification and safety, it is thus convenient to assemble into a single unit providing a simultaneous coupling the means interconnecting the two circuits.

It is the primary object of the present invention to meet this requirement by providing a quick-fitting pipe coupling wherein the coupling member comprises a pair of separate fluid circulation passages each adapted to communicate through a different port formed through the surrounding sliding socket with two series of passages formed separately in said body and said locking member, whereby a double fluid circuit can be coupled through a single coupling member.

To facilitate the manufacture of this quick-fitting pipe coupling, the two fluid circulation passages formed in the coupling member are concentric to each other and to the longitudinal axis of this member, and the passages formed through the body and the locking member are superposed and substantially parallel to each other.

Finally, according to a typical and preferred form of embodiment of this invention, the two concentric fluid circulation passages formed in said coupling member consist the one of a central blind bore in which a cylindrical pipe section is force fitted through a predetermined length, the outer end of said pipe section being rigidly secured to a union connecting the device to one of the fluid circuits, said bore comprising at its blind inner end a perpendicular or radial orifice communicating or registering with one of the ports of said sliding socket, and the other of a bore having a greater diameter but a smaller length than said central blind bore, which is closed at its inner end by said pipe section also acting as a means for separating the two passages from each other, and at its outer end by said union connecting the device to the first fluid circuit, said second bore comprising a pair of radial or perpendicular orifices communicating the one with the second port of said sliding socket and the other with the second fluid circuit.

It will be appreciated that this arrangement, through the use of extremely simple components and therefore at a very low manufacturing and maintenance cost, is capable of providing with the maximum safety (inasmuch as it prevents coupling errors) the necessary connections of a double hydraulic supply circuit by means of a single coupling member.

Other features of the present invention will appear as the following description proceeds with reference to the accompanying drawing illustrating diagrammatically by way of example a preferred form of embodiment of a quick-fitting pipe coupling according to this invention. In the drawing.

Figure 1:
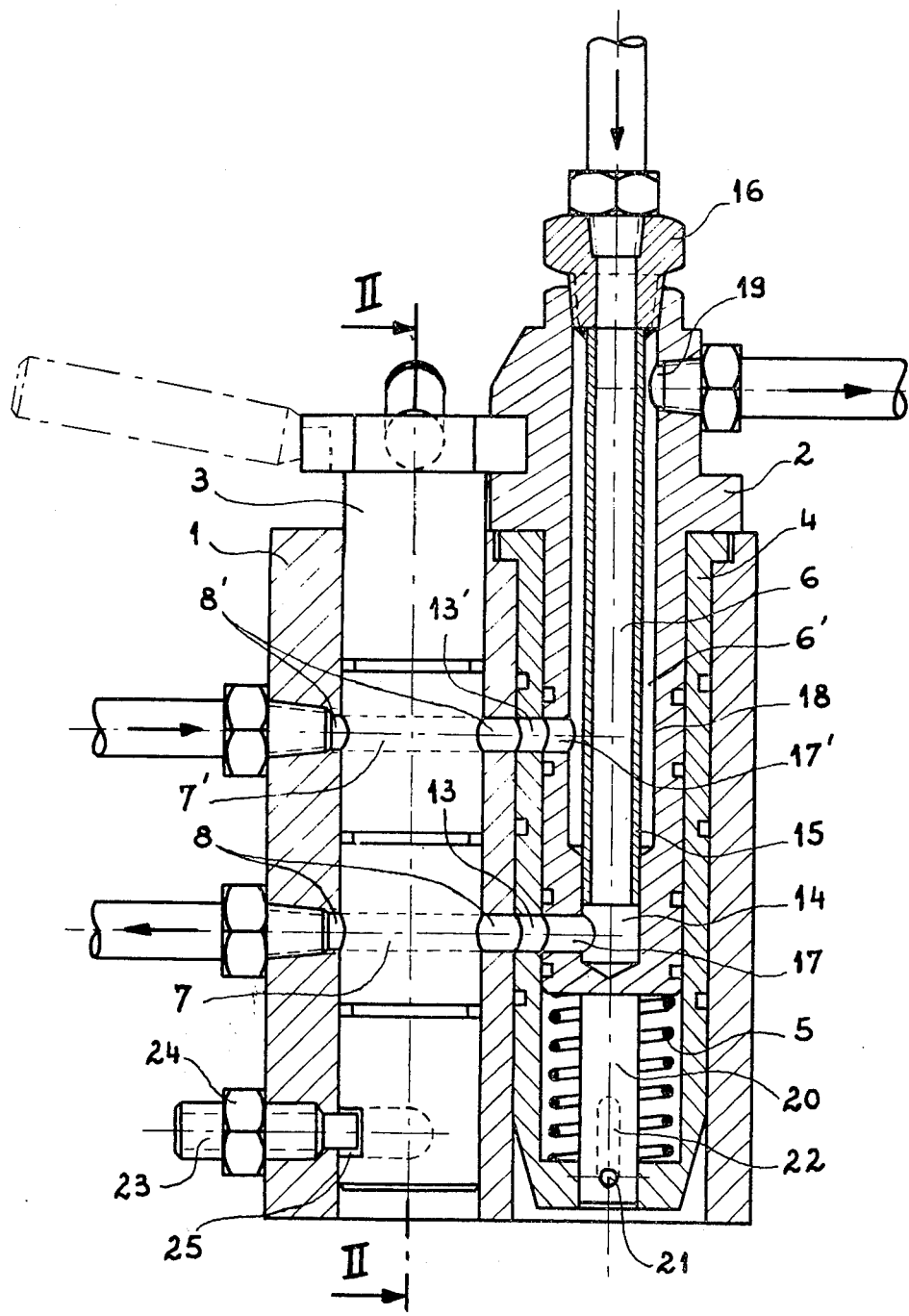
FIG. 1 is a section taken along the line I—I of FIG. 2 showing a quick-fitting pipe coupling according to this invention, the coupling being shown in its coupling member locking position.

The quick-fitting pipe coupling illustrated in FIG. 1 comprises essentially a body 1 adapted to be secured for example on the frame or like structure of a machine, such as a machine tool, a coupling member 2 and a locking member 3, the coupling member 2 being surrounded by a sliding socket 4 which, due to the force of a coil compression spring 5, is adapted during the uncoupling movement to shut off the fluid passage between said coupling member 2 and the locking member 3, this locking member 3 permitting the passage of fluid therethrough only when the locking member 3 is in its coupling member locking position.

According to this invention the coupling member 2 comprises two separate fluid circulation passages 6 and 6' concentric to each other and to the longitudinal axis of said coupling member 2; each passage 6, 6' communicates via a port 13, 13' respectively, formed through the sliding socket 4, with two series of aligned passages 7, 8 and 7', 8' superposed by pairs, as shown, and formed through the body 1 (passages 8, 8') and the locking member 3 (passages 7, 7').

The internal passage 6 consists of a central blind bore 14 having force fitted therein along a predetermined length a cylindrical pipe section 15 having its outer or upper end rigidly secured to a union 16 connecting the pipe section 15 to one of the fluid circuits, said central blind bore comprising at its inner end or bottom a radial or perpendicular port 17 communicating in the locked position with the port 13 of said sliding socket 4. The outer passage 6' comprises a bore 18 of greater diameter but shorter length than said central blind bore 14 of passage 6, and is also closed at its inner bottom end by said pipe section 15 constituting at the same time the means separating the two passages 6 and 6' from each other. At its upper or outer end, this bore 18 is closed by the union 16 connecting the device to the first fluid circuit. Furthermore, this second bore 18 is also provided with a pair of perpendicular or radial ports 17' and 19, of which one 17' communicates in the locked position with the port 13' of said sliding socket 4 and the other 19 communicates with the second fluid circuit. Finally, the passages 8 and 8' formed in the coupling body 1, the connecting union 16 and the port 19 of coupling member 2 are connected via screw unions of known type to the two fluid circuits of which FIG. 1 illustrates an exemplary yet not limiting mode of operation by means of arrows, for it will be readily understood by those conversant with the art that the mode of operation of the device may be modified to suit various requirements.

In order to improve the centering of the coupling member 2 in the sliding socket 4, the former comprises at its bottom or inner end a cylindrical stud 20 slidably engaging a central bore formed in the bottom of said socket 2. This cylindrical stud 20 carries at least one radial pin 21 consisting of one portion of a cylindrical rod force fitted through a diametrical hole formed in said cylindrical stud 20; this pin 21 is adapted to engage at least one elongated hole 22 constituting a slideway and formed along one generatrix of said sliding socket 4, for the dual purpose of holding said coupling member 2 against rotation in said sliding socket 4, and also limiting the relative axial movement of these two members 2 and 4, in order to preserve a perfect registration between ports 13 and 17, on the one hand, and ports 13' and 17', on the other hand, in the locked position, while preventing the fall and the loss of said sliding socket 4 and also of the spring 5 associated therewith when disengaging or uncoupling the quick-fitting pipe coupling of this invention.

Similarly, the body 1 comprises at its lower portion a shouldered set screw 23 locked in its operative position by a nut 24, the shouldered portion of the screw 23 engaging a corresponding notch 25 formed adjacent the bottom or inner end of the locking member for locking the latter in turn against any axial movement of translation while permitting its movement of rotation.

Figure 2:
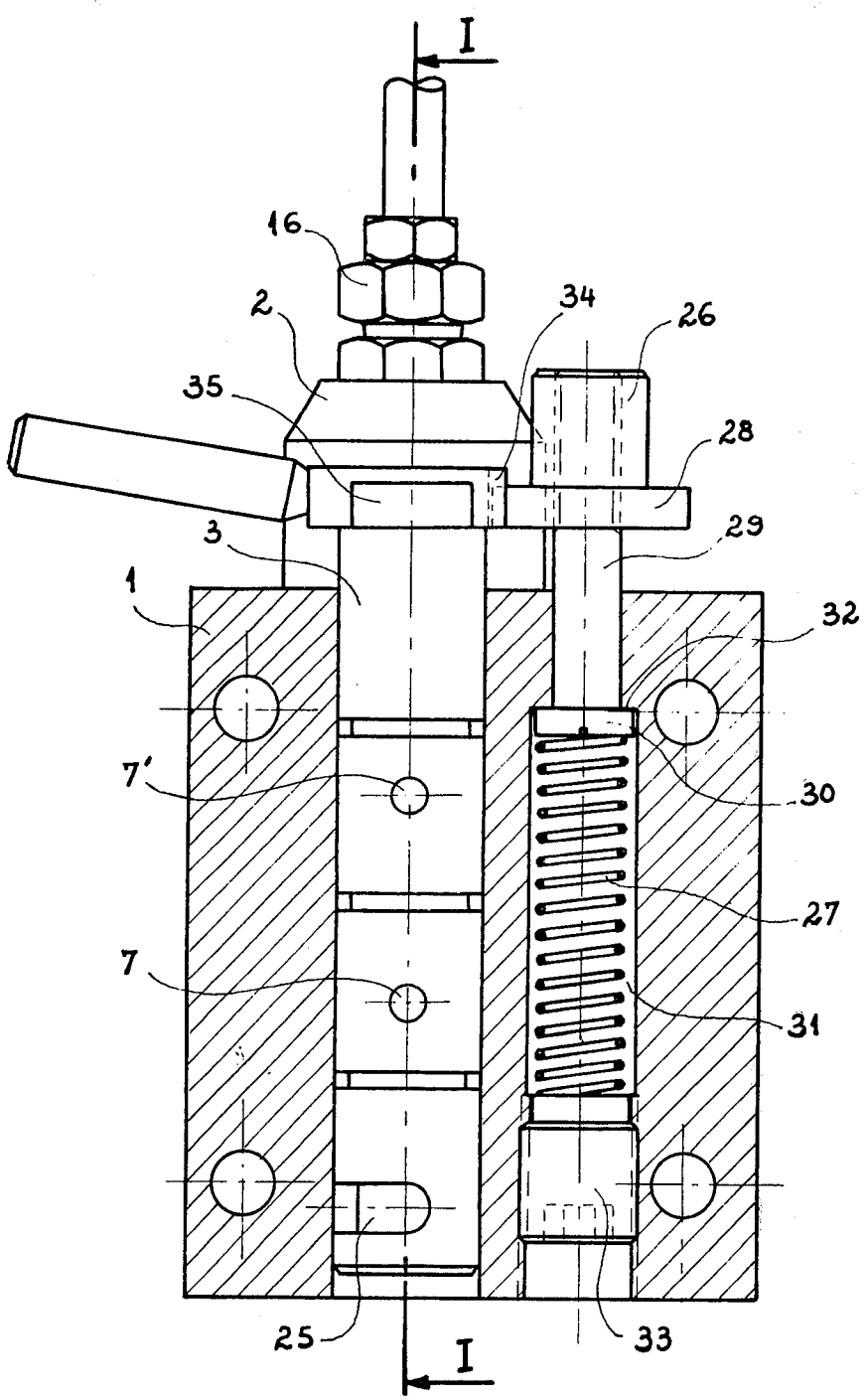
FIG. 2 is a section taken along the line II—II of FIG. 1, with the coupling member also shown in its locked position.
Figure 3:
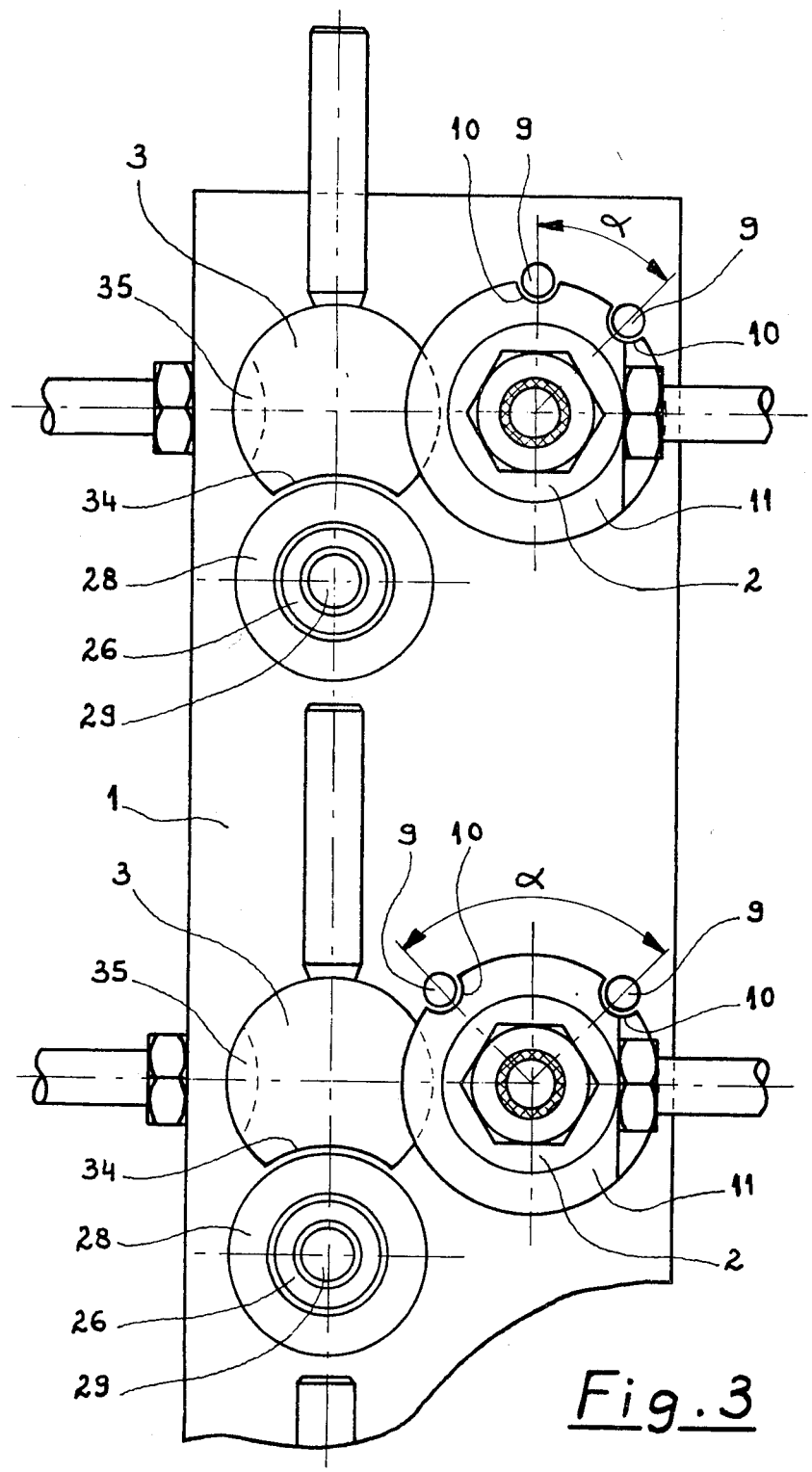
FIG. 3 is a plane view from above of the quick-fitting pipe coupling of this invention which also acts as a connecting or distributor body for a plurality of different fluid-supply double circuits.

As illustrated in FIG. 2, the member 3 for locking the coupling member 2 is also held in its locking and release positions, respectively by means of a manually operated push member 26 constantly urged to its locking position, when released, by a resilient member 27 housed in the body 1. This push member 26 comprises a cylindrical body formed at its lower portion with a flange 28 and engaged from underneath by a screw 29 adapted to be tightened home in a tapped hole formed therein after passing through an upper plain hole formed through the top portion of said body 1, the head 30 of said screw 29 being housed in a bore 31 formed in said body 1 and engaging a shoulder 32 of said bore, as shown, under the resilient pressure of said member 27 consisting of a coil compression spring engaging with one end the head of said screw 29 and reacting with its opposite end against a screw plug 33 fitted in a tapped portion of said bore 31 of body 1. As illustrated in FIG. 3, the element for holding in its locked position the locking member proper 3, in conjunction with the flange 28 of push member 26, consists of a semi-circular notch 34 formed on said locking member 3 to permit the release of the coupling member 2 in the release position of the assembly.

Another notch 35 is formed on the locking member 3 at right angles to the notch 34 and is substantially similar to the latter, to permit the locking of the locking member 3 itself in the release position of the assembly. The only difference existing between the notches 34 and 35 lies in the fact that the notch 35 does not open on the top surface of the locking member 3, since it is not intended for permitting the release of the coupling member 2, thus eliminating the undesired consequences of a faulty manoeuvre, in contrast to the notch 34 opening on said top surface.

FIG. 3 further illustrates the possibility afforded by the quick-fitting pipe coupling of this invention of being also used, as mentioned in the aforesaid prior patent, as a multiple coupling device adapted to interconnect a plurality of fluid circuits. In this case the body 1 acting as a connecting box for a plurality of different double circuits, for different fluids, each coupling member 2, and the fitting well corresponding thereto in said body 1, comprise assembling means known per se which are inherent thereto and adapted to prevent the assembling thereof with other fitting wells and other coupling members. These assembling means may consist, as illustrated, of a pair of studs or pins 9 projecting from the top surface of the body 1 and adapted to engage a corresponding pair of notches 10 formed in the outer periphery of the bearing flange 11 of each coupling member 2, each assembly of pairs of notches 9 and notches 10 being disposed at a different angular spacing α so that in case of erroneous fitting or inversion of certain coupling members 2 these members cannot be locked in their operative position in said body 1.

Of course, the various forms of embodiment described hereinabove and illustrated in the accompanying drawing are given by way of example, not of limitation; therefore, many modifications and changes may be brought thereto by those skilled in the art without departing from the basic principles of the invention as set forth in the appended claims.

What is claimed as new is:

1. Quick-fitting pipe coupling comprising a body adapted to be secured to a machine frame or like structure, a coupling member adapted to be fitted into said body, a locking member means secured to said body for locking said coupling member to said body, fluid passage means formed in said coupling member being at right angles in order to direct the fluid into said coupling perpendicularly to the direction of fitting of said coupling member in said body, said coupling member being adapted to be fitted into said body and comprising an inner member and locking means including a socket adapted to slide on said inner member, said socket opening the fluid passage means when said coupling member is fitted into said body and closing said passage when it is released therefrom, said locking member means including valve means interposed between a part of said body and said coupling member permitting the flow of fluid through itself when locking said coupling member in said body and permitting the release of said coupling member from said body only when said fluid passage means is blocked by said valve means, said fluid passage means comprising a pair of separate fluid circulation paths concentric to each other and to the longitudinal axis of said coupling member, each path communicating via a different port formed through the wall of said sliding socket with two series of superposed passages substantially parallel to each other, which superposed and parallel passages are formed in said body and said locking member means including said valve means, thus permitting simultaneous connection of double fluid circuits by using a single coupling member.

2. Quick-fitting pipe coupling as set forth in claim 1, wherein a first of said two concentric fluid paths formed in said coupling member includes a central blind bore in which a predetermined length of a cylindrical pipe section is force fitted to a predetermined depth, said pipe section having its top or outer end rigidly connected to a pipe union leading to or from one of the double fluid circuits, and comprising at its base or bottom a perpendicular port communicating with one of the ports formed through the wall of said sliding socket, the other of said two concentric fluid paths having a bore of greater diameter and smaller depth than the bore of said central blind bore, its bottom or inner end closed by said pipe section which also acts as a separating wall between the two paths, and its upper or outer end closed by said pipe union, said bore of said other fluid path including a pair of perpendicular ports communicating the one with the other of the ports formed through the wall of said sliding socket and the other with the other of the double fluid circuits.

3. Quick-fitting pipe coupling as set forth in claim 1, wherein the inner member of said coupling member includes at its bottom or inner end a cylindrical stud slidably engaging a central bore formed in the bottom of said sliding socket, said stud comprising at least one radial pin adapted to engage at least one elongated hole acting as a slideway and formed along one generatrix of said sliding socket.

4. Quick-fitting pipe coupling as set forth in claim 1, wherein said locking member means includes a member rotatable between a position locking and a position releasing said coupling member and said body includes at its lower portion a shouldered set screw adapted to engage its shouldered portion into a corresponding notch formed at the bottom of said member of said locking member means for holding said member against any axial movement of translation while permitting rotational movement thereof.

5. Quick-fitting pipe coupling as set forth in claim 1, wherein said locking member means includes a manually operated push member constantly urged to a locking position by resilient means housed in said body, the push member being adapted to hold the locking member means in its locking and release positions.

6. Quick-fitting pipe coupling as set forth in claim 5, wherein the locking member means includes a member rotatable between a position locking and a position releasing said coupling member and a flange attached to the top of said rotatable member, said push member engaging a semi-circular notch formed in said flange to hold said rotatable member in said locking position, said notch permitting the release of said coupling member upon rotation of said rotatable member to said release position.

7. Quick-fitting pipe coupling as set forth in claim 1, further including means for connecting a plurality of double circuits comprising a plurality of wells formed in said body, locking member means associated with each of said wells, coupling members adapted to be fitted into respective ones of said plurality of wells, and means associated with each of said plurality of wells for preventing the fitting of a wrong coupling member into a well.

* * * * *